United States Patent [19]

Maresca et al.

[11] Patent Number: 4,473,684

[45] Date of Patent: Sep. 25, 1984

[54] POLY (ARYL ETHER)S

[75] Inventors: Louis M. Maresca, Belle Mead; Herbert S. Chao, Piscataway, both of N.J.

[73] Assignee: Union Carbide Corporation, Danbury, Conn.

[21] Appl. No.: 485,948

[22] Filed: Apr. 18, 1983

[51] Int. Cl.$^3$ .............................................. C08G 65/40
[52] U.S. Cl. .................................... 525/132; 525/150; 525/434; 525/436; 525/437; 525/462; 528/125; 528/126; 528/128; 528/174
[58] Field of Search ............... 528/174, 125, 126, 128; 525/132, 150, 434, 436, 437, 462

[56] References Cited

U.S. PATENT DOCUMENTS

| | | | |
|---|---|---|---|
| 4,008,203 | 2/1977 | Jones | 260/49 |
| 4,105,635 | 8/1978 | Freeman | 528/174 |
| 4,108,837 | 8/1978 | Johnson et al. | 528/174 |
| 4,175,175 | 11/1979 | Johnson et al. | 528/125 |
| 4,200,728 | 4/1980 | Blinne et al. | 528/174 |
| 4,208,508 | 6/1980 | Hashino et al. | 528/174 |
| 4,339,568 | 7/1982 | Maresca | 528/126 |

OTHER PUBLICATIONS

R. N. Johnson, "Polysulfones", Encyclopedia of Polymer Science and Technology, vol. 11 (John Wiley & Sons, Inc. 1969).

*Primary Examiner*—Lester L. Lee
*Attorney, Agent, or Firm*—Gerald L. Coon

[57] ABSTRACT

Poly(aryl ether)s which contain at least 20% by weight of bis-(3,5-dimethyl-4-oxyphenyl)sulfone structural units exhibit improved glass transition temperatures, improved flame resistance, improved gas permeability and improved alloying compatibility.

17 Claims, No Drawings

POLY (ARYL ETHER)S

BRIEF SUMMARY OF THE INVENTION

Technical Field

This invention relates to poly(aryl ether)s which contain bis-(3,5-dimethyl-4-oxyphenyl)sulfone as a structural unit.

BACKGROUND OF THE INVENTION

The preparation and properties of poly(aryl ether)s, such as polysulfones are known in the art. R. N. Johnson, "Polysulfones" in *Encyclopedia of Polymer Science and Technology,* vol. 11 (John Wiley & Sons, Inc. 1969) discloses that aromatic polysulfones can be prepared from dihydric phenols and 4,4'-dichlorodiphenyl sulfone. U.S. Pat. No. 4,339,568 to Maresca discloses that thermoplastic linear polymers may be prepared from monomers which include 4,4'-dichlorodiphenyl sulfone, 4,4'-dichlorobenzophenone, hydroquinone, and 4,4'-biphenol. The patent also states that the aromatic rings may contain alkyl or cycloalkyl substituents.

U.S. Pat. No. 4,175,175 to Johnson et al., discloses the preparation of polyarylene polyethers from dihydric phenols and dihalobenzenoid compounds. The dihydric phenols include benzophenone, aromatic sulfones and aromatic ethers, all of which may be optionally alkyl substituted. U.S. Pat. No. 4,008,203 to Jones discloses polysulfones that may contain aromatic ether linkages. These polymers are prepared by sulfonylation of aromatic ethers and aromatic thioethers with aromatic sulfonyl chlorides.

None of the above references specify the preparation or properties of a poly(arly ether) prepared from monomers which include bis-(3,5-dimethyl-4-hydroxyphenyl)sulfone.

DISCLOSURE OF THE INVENTION

This invention relates to poly(aryl ether)s containing recurring units of the following formula

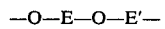

wherein E is the residuum of a dihydric phenol which is at least about 20 weight percent of bis-(3,5-dimethyl-4-oxyphenyl) sulfone, and E' is the residuum of a benzenoid compound. The poly(aryl ether)s of this invention, which contain at least 20% by weight of bis-(3,5-dimethyl-4-oxyphenyl)sulfone, structural units exhibit many improved properties. These improved properties include higher glass transition temperatures, improved alloy capabilities with styrenic polymers and polycarbonates based on Bisphenol-A, increased flame resistance, and greater gas permeability.

DETAILED DESCRIPTION

The polymers of this invention, produced by the process of this invention, may be characterized as poly(aryl ether)s. They are generally prepared by reacting a dihydroxyphenol with an activated dihalo-substituted aromatic compound. The essential feature of this invention is the requirement that at least 20% by weight of the polymer must be composed of the monomer bis-(3,5-dimethyl-4-hydroxyphenyl)sulfone (hereinafter referred to as TMBS). This results in a polymer which contains the monomeric unit that may be characterized as bis-(3,5-dimethyl-4-oxyphenyl)sulfone. The 20% value is an approximate minimum value; a greater amount of the TMBS monomer is preferably used in order to maximize the desirable properties of these polymers.

Specifically, the poly(arly ether)s of this invention contain recurring units of the following formula:

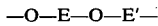

wherein E is the residuum of a dihydric phenol which contains from about 20 weight percent to 100 weight percent of repeating units (I) having the formula

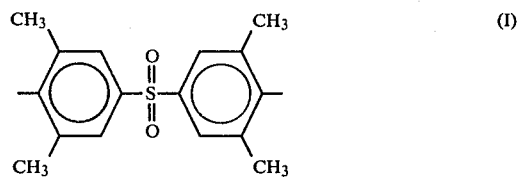

and from 0 weight percent to about 80 weight percent of repeating units (II) having the formula

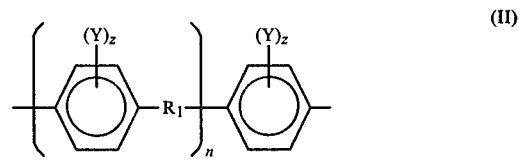

wherein Y is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated aliphatic hydrocarbon radical, particularly an alkylene or alkylidene radical having from 1 to 6 carbon atoms, or a cycloalkylidene or cycloalkylene radical having up to and including 9 carbon atoms, O, CO, $SO_2$, S or a direct bond, with the proviso that when $R_1$ is $SO_2$ then repeating unit (II) is not the same as repeating unit (I), E' is the residuum of a benzenoid compound having an inert electron withdrawing group in at least one of the positions ortho and para to the valence bonds; both of said residua are valently bonded to the ether oxygens through aromatic carbon atoms.

Suitable bisphenol compounds which give repeating units (II) having the formula described above, in addition to 2,2-bis-(4-hydroxyphenyl) propane (Bisphenol A) and bis-(4-hydroxyphenyl) sulfone, include bis-(4-hydroxyphenyl) methane, 2,2-bis(4-hydroxy-3-methylphenyl) propane, 4,4-bis-(4-hydroxyphenyl) heptane, 2,2-bis-(3,5-dichloro-4-hydroxyphenyl) propane, 2,2-bis(3,5-dibromo-4-hydroxyphenyl) propane, and bis-(3-chloro-4-hydroxyphenyl) methane. Other bisphenol compounds are also available and are disclosed in U.S. Pat. Nos. 2,999,835, 3,028,365 and 3,334,154.

As herein used the E' term defined as being the "residuum of the dihydric phenol" of course refers to the residue of the dihydric phenol after the removal of the two aromatic hydroxyl groups. Thus as is readily seen these poly(aryl ether)s contain recurring groups of the residuum of the dihydric phenol and the residuum of the benzeonid compound bonded through aromatic ether oxygen atom.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro-group. The dihalobenzenoid or dinitrobenzenoid compound can be either mononuclear where the halogens or nitro groups are attached to the same benzenoid rings or polynuclear where they are attached to different benzenoid rings, as long as there is an activating electron withdrawing group in the ortho or para position of that benzenoid nucleus. Fluorine, chlorine and nitro substituted benzenoid reactants are preferred; the fluorine and nitro compounds for fast reactivity and the chlorine compounds for their inexpensiveness.

An electron withdrawing group can be employed as the activator group in these compounds. It should be, of course, inert under the reaction conditions, but otherwise its structure is not critical. Preferred are the strong activating groups such a the sulfone group

bonding two halogen or nitro substituted benzenoid nuclei as in the 4,4'-dichlorodiphenyl sulfone and 4,4'-difluorodiphenyl sulfone, although such other strong withdrawing groups can also be used with equal ease.

Exemplary of suitable benzenoid compounds are the 4,4'-dihalo-substituted aromatic sulfones or benzophenones such as 4,4-dichlorodiphenyl sulfone, 4,4'-difluorodiphenyl sufone, 4,4'-dichlorobenzophenone or 4,4'-difluorobenzophenone. An optional feature of this invention is the substitution of a portion of the TMBS monomer with other dihydric phenols such as Bisphenol-A, bis-(4-hydroxyphenyl)sulfone, hydroquinone or 4,4'-biphenol.

The polymers of this invention are formed by the reaction of the specified dihydric phenols with the specific dihalo-substituted aromatic compounds in an anhydrous dipolar aprotic solvent in the presence of a strong base. Specifically the polymers are prepared by the substantially equimolar one-step reaction of a double alkali metal salt of dihydric phenol with a dihalobenzenoid compound in the presence of specific liquid organic sulfoxide or sulfone solvents under substantially anhydrous conditions. Catalysts are not necessary for this reaction.

The polymers may also be prepared in a two-step process in which a dihydric phenol is first converted in situ in the primary reaction solvent to the alkali metal salt with an alkali metal, an alkali metal hydride, alkali metal hydroxide, alkali metal alkoxide or an alkali metal alkyl compound. Preferably, an alkali metal hydroxide is employed. After removing the water which is present or formed, in order to secure substantially anhydrous conditions, the dialkali metal salts of the dihydric phenol are admixed and reacted with about stoichiometric quantities of the dihalobenzenoid or dinitrobenzenoid compound.

Additionally, the polymers may be prepared by the procedure described in, for example, U.S. Pat. No. 4,176,222 in which a substantially equimolar mixture of at least one bisphenol and at least one dihalobenzenoid are heated at a temperature of from about 100° C. to about 400° C. with a mixture of sodium carbonate or bicarbonate and a second alkali metal carbonate or bicarbonate having a higher atomic number than that of sodium.

Further, the polymers may be prepared by the procedure described in Canadian Pat. No. 847,963 wherein the bisphenol and dihalobenzenoid compound are heated in the presence of potassium carbonate using a high boiling solvent such as diphenylsulfone.

The polymerization reaction is performed under substantially anhydrous conditions so as to avoid side reactions that can be caused by the presence of a water. Procedures for removing water from such a system are well known in the art and include treatment with a dehydrating agent such as a mineral salt that will take up the water or azeotropic techniques that will remove water from the reaction medium as an azeotrope. Alternatively the water can be sparged from the reaction media using an inert gas sparge (e.g., nitrogen).

U.S. Pat. No. 4,339,568 describes azeotroping techniques that are useful in the practice of this invention to ensure that the reaction medium remains substantially anhydrous. An organic solvent is chosen as an azeotroping co-solvent with the dipolar aprotic solvent. This azeotroping co-solvent is one which is inert to the polymerizing reactants, but will form an azeotrope with water. The azeotroping co-solvent is added to the reaction medium and is then continuously removed from the reaction medium by volatilizing the solvent as an azeotrope with water. Examples of suitable azeotroping co-solvents include aromatic hydrocarbons such as benzene, toluene, xylene and ethylbenzene and haloaromatics such as chlorobenzene and o-dichlorobenzene.

The dipolar aprotic solvents useful in the process of the instant invention are well known in the art. Exemplary of such solvents are dimethylsulfoxide (DMS), dimethylformamide (DMF), N-methyl-2-pyrrolidone (NMP), diphenyl sulfone and sulfolane all of which will serve to dissolve the reactants in a nonaqueous liquid medium. The temperature at which the reaction medium is maintained is not narrowly critical, however, it is desirable to keep the reaction medium at a temperature at which all of the reactants dissolve in the solvent chosen for the reaction medium.

It is generally desirable to add a chain stopper to the reaction mixture when the desired degree of polymerization has been achieved. These chain stoppers are molecules which have only one site that is reactive in the polymerization reaction such that the chain stopper molecule becomes the terminal unit of the polymer. Examples of such chain stoppers include activated mono-halo-aromatic compounds, such as monochlorodiphenyl sulfone and monochlorobenzophenone, and simple monohalo-aliphatic compounds, also known as alkyl halides, such as methyl chloride. Compounds such as benzyl chloride, which is an aryl-substituted alkyl halide are also suitable chain stoppers. The addition of these compounds to the reaction mixture will serve to terminate the polymerization reaction and to stabilize the resulting polymer at the desired degree of polymerization.

The procedures described in U.S. Pat. No. 4,339,568 and U.S. Pat. No. 4,175,175 are especially useful in the practice of the instant invention to produce the polymers of the instant invention. The disclosure of those patents is therefore incorporated herein by reference.

The poly(aryl ether)s of the instant invention exhibit many improved properties including higher glass transition temperatures, increased flame resistance and greater gas permeability. The polymers of the instant invention also exhibit improved compatability with other polymers in polymer alloys, i.e. the polymers of the instant invention may be advantageously alloyed with styrenic polymers, polycarbonates made from bisphenol-A and other polyester carbonates aromatic polyesters, polyarylates, poly(ether imide)s, and the like.

EXAMPLE 1

Into a 500 milliliter flask equipped with a mechanical stirrer, a distillate trap, a thermocouple and a condenser was charged with 45.96 grams (0.15 moles) of bis-(3,5-dimethyl-4-hydroxyphenyl) sulfone, 43.08 grams (0.15 moles) of 4,4'-dichlorodiphenyl sulfone, 21.86 grams (0.155 moles) of potassium carbonate, 182.20 grams of sulfolane and 50 milliliters of chlorobenzene. The reaction mixture was heated under nitrogen to 225° C. In the process of heating, chlorobenzene was distilled along with water formed in the reaction. After 12 hours at 225° C., the reaction mixture was cooled and the polymer isolated by coagulation in water. The polymer was washed with water and then dried in a vacuum oven at 100° C.

The polymer had a reduced viscosity of 0.64 dl/g as measured in N-methyl-2-pyrrolidinone (0.2 g/100 ml) and exhibited excellent physical and mechanical properties.

The following physical properties were determined: 1% secant modulus according to ASTM D-638; tensile strength according to ASTM D-638; elongation at break according to ASTM D-638; and pendulum impact strength. Also, the glass transition temperature of the polymer was measured by resilience minimum as described in O. Olabisi et al, "Polymer-Polymer Miscibility," Academic Press, New York, 1979, p. 126.

The results are shown in the following Table.

TABLE

| Property | Result |
| --- | --- |
| 1% Secant Modulus (psi) | 274,000 |
| Tensile Strength (psi) | 11,700 |
| % Elongation | 6.7 |
| Pendulum Impact Strength (ft-lbs/in$^3$) | 15 |
| Tg (°C.) | 265 |

We claim:

1. A poly(aryl ether) containing recurring units of the following formula:

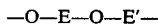

wherein E is the residuum of a dihydric phenol which is at least about 20 weight percent of bis-(3,5-dimethyl-4-hydroxyphenyl) sulfone and E' is the residuum of a benzenoid compound.

2. A poly(aryl ether) as defined in claim 1 wherein E is the residuum of a dihydric phenol which contains from about 20 weight percent to 100 weight percent of repeating units (I) having the formula

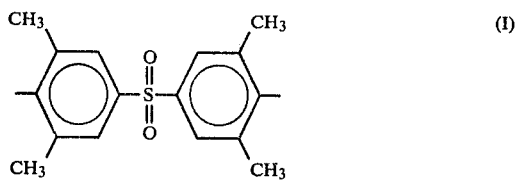

and from 0 weight percent to about 80 weight percent of repeating units (II) having the formula

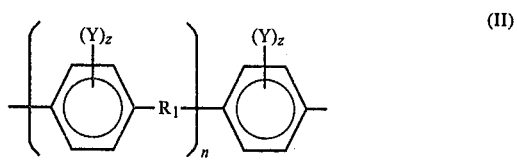

wherein Y is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated aliphatic hydrocarbon radical, O, CO, SO$_2$, S or a direct bond, with the proviso that when $R_1$ is SO$_2$ then repeating unit (II) is not the same as repeating unit (I).

3. A poly(aryl ether) as defined in claim 2 wherein unit (II) is the residuum of bisphenol A.

4. A poly(aryl ether) as defined in claim 2 wherein repeating unit (II) is the residuum of hydroquinone.

5. A poly(aryl ether) as defined in claim 2 wherein repeating unit (II) is the residuum of bis-(4-hydroxyphenyl) sulfone.

6. A poly(aryl ether) as defined in claim 2 wherein repeating unit (II) is the residuum of 4,4'-biphenol.

7. A poly(aryl ether) as defined in claim 1 wherein E' is the residuum of 4,4'-dichlorodiphenyl sulfone.

8. A poly(aryl ether) as defined in claim 1 wherein E' is the residuum of 4,4'-difluorobenzophenone.

9. A poly(aryl ether) as defined in claim 1 wherein E' is the residuum of 4,4'-difluorodiphenyl sulfone.

10. A poly(aryl ether) as defined in claim 1 wherein E' is the residuum of 4,4'-dichlorobenzophenone.

11. A polymer alloy of the poly(aryl ether) as defined in claim 1 and a thermoplastic polymer.

12. A polymer alloy as defined in claim 11 wherein the polymer is an aromatic polycarbonate.

13. A polymer alloy as defined in claim 12 wherein the polycarbonate is derived from bisphenol A.

14. A polymer alloy as defined in claim 11 wherein the polymer is a poly(ester-carbonate).

15. A polymer alloy as defined in claim 11 wherein the polymer is a polyarylate.

16. A polymer alloy as defined in claim 11 wherein the polymer is a poly(ether imide).

17. A polymer alloy as defined in claim 11 wherein the polymer is a styrenic polymer.

* * * * *